(12) United States Patent
Wang et al.

(10) Patent No.: US 11,733,080 B2
(45) Date of Patent: Aug. 22, 2023

(54) SYSTEM AND METHOD FOR MEASURING RISING VELOCITY AND DEFORMATION OF BUBBLE IN VISCOUS FLUID

(71) Applicant: Zhejiang University, Hangzhou (CN)

(72) Inventors: Fei Wang, Hangzhou (CN); Jinhui Fan, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 17/986,907

(22) Filed: Nov. 15, 2022

(65) Prior Publication Data

US 2023/0175876 A1 Jun. 8, 2023

(30) Foreign Application Priority Data

Dec. 2, 2021 (CN) .......................... 202111460495.2

(51) Int. Cl.
*G01F 1/74* (2006.01)
(52) U.S. Cl.
CPC ...................................... *G01F 1/74* (2013.01)
(58) Field of Classification Search
None
See application file for complete search history.

(56) References Cited

U.S. PATENT DOCUMENTS

| | | |
|---|---|---|
| 6,408,679 B1 | 6/2002 | Kline-Schoder et al. |
| 2007/0161901 A1 | 7/2007 | Takeda et al. |
| 2010/0212407 A1 | 8/2010 | Stringham et al. |
| 2013/0269416 A1 | 10/2013 | Myrick et al. |
| 2017/0356882 A1 | 12/2017 | Becerra et al. |
| 2019/0154482 A1* | 5/2019 | Desmond ................ G01F 1/663 |

FOREIGN PATENT DOCUMENTS

| | | |
|---|---|---|
| CN | 104807512 A | 7/2015 |
| CN | 105222833 A | 1/2016 |
| CN | 108956720 A | 12/2018 |
| GB | 1578660 A | 11/1980 |

* cited by examiner

*Primary Examiner* — Harshad R Patel
(74) *Attorney, Agent, or Firm* — Bayramoglu Law Offices LLC

(57) ABSTRACT

A system for measuring a rising velocity and a deformation of a bubble in a viscous fluid includes a sample cell configured to hold a viscous fluid, a variable-diameter syringe provided at a bottom of the sample cell and configured to generate a bubble in the viscous fluid, two ultrasonic transmitting and receiving transducers arranged at different heights of the sample cell and configured to transmit first ultrasonic signals to the viscous fluid and receive second ultrasonic signals reflected by the bubble, and a host computer configured to analyze time-domain information of the second ultrasonic signals received by the two ultrasonic transmitting and receiving transducers, calculate the rising velocity of the bubble, build a mathematical model about a bubble size and a reflected sound pressure, analyze frequency-domain information of the second ultrasonic signals received by the two ultrasonic transmitting and receiving transducers, and calculate the deformation of the bubble.

11 Claims, 5 Drawing Sheets

SYSTEM AND METHOD FOR MEASURING RISING VELOCITY AND DEFORMATION OF BUBBLE IN VISCOUS FLUID

CROSS REFERENCE OF THE RELATED APPLICATION

The present invention is based on and claims foreign priority to Chinese patent application No. 202111460495.2 filed on Dec. 2, 2021, the entire content of which is incorporated herein by reference.

TECHNICAL FIELD

The present disclosure relates to the technical field of online real-time measurement of industrial production processes and in particular to a system and method for measuring a rising velocity and deformation of a bubble in a viscous fluid.

BACKGROUND

Viscous fluids, such as biological fermentation liquid and crude oil, are often involved in biological, petrochemical, and other industrial processes. Bubbles are often generated in viscous fluids due to production requirements, improper operation, and other factors. The size and moving velocity of bubbles have an important impact on the flow state and quality of the viscous fluid, and even the safety of the production process. Therefore, it is necessary to measure the moving velocity and shape of bubbles in the viscous fluid online during production. This is of great significance for understanding the flow state and quality of the viscous fluid to adjust production parameters in real time, achieve efficient production, and prevent dangerous accidents.

Because bubbles are ubiquitous in basic operation processes such as gas mixing and heat transfer, the movement behavior of bubbles in water has attracted extensive attention. There have been a lot of studies on the growth and movement of bubbles in water, but there are few studies on the movement of bubbles in viscous fluids. The existing studies on the growth and movement of bubbles in viscous fluids are mostly limited to high-velocity photography. They investigate the change rule of the shape and velocity of bubbles rising in viscous fluids through digital image processing or monitor bubbles through an electric capacitance tomography (ECT) system (Chinese patent application CN201810528828.2). High-velocity photography requires a high-velocity camera, which is expensive and requires a clean application environment to avoid polluting the camera. To configure the ECT system, it is needed to arrange capacitive transducers in multiple directions, which puts forward a high requirement on the measurement environment and makes the subsequent reconstruction algorithm very complex. At present, there are few reports on the simultaneous online measurement of the rising velocity and deformation of bubbles in viscous fluids by an ultrasonic method. Given this, the present disclosure is proposed, which features a simple principle, low equipment cost, and wide application scenarios. Therefore, the present disclosure has important research significance and favorable development prospects.

SUMMARY

To solve most, if not all, of the technical problems mentioned in the background, an objective of the present disclosure is to provide a system and method for measuring a rising velocity and deformation of a bubble in a viscous fluid.

To achieve the above objective, the present disclosure provides the following technical solutions.

The system for measuring a rising velocity and deformation of a bubble in a viscous fluid includes:
  a sample cell configured to hold a viscous fluid;
  a variable-diameter syringe provided at a bottom of the sample cell and configured to generate a bubble in the viscous fluid;
  two ultrasonic transmitting and receiving transducers arranged at different heights of the sample cell and configured to transmit first ultrasonic signals to the viscous fluid and receive second ultrasonic signals reflected by the bubble; and
  a host computer configured to analyze time-domain information of the second ultrasonic signals received by the two ultrasonic transmitting and receiving transducers, calculate a rising velocity of the bubble, build a mathematical model about a bubble size and a reflected sound pressure, analyze frequency-domain information of the second ultrasonic signals received by the two ultrasonic transmitting and receiving transducers, and calculate the deformation of the bubble.

Further, the rising velocity of the bubble is calculated by calculating the time difference of the second ultrasonic signals received by the two ultrasonic transmitting and receiving transducers and dividing the height difference of the two ultrasonic transmitting and receiving transducers by the time difference to acquire the rising velocity of the bubble.

Further, the deformation of the bubble is calculated by substituting reflected sound pressures of the second ultrasonic signals received by the two ultrasonic transmitting and receiving transducers into the mathematical model to acquire two bubble sizes and calculating a difference between the two bubble sizes to acquire the deformation of the bubble.

Further, the mathematical model is:

$$y=0.0987x+0.0135$$

where y denotes the reflected sound pressure and x denotes the diameter of the bubble.

Further, the host computer corrects the rising velocity of the bubble according to the bubble sizes by:
  subtracting the difference between the two bubble sizes from the height difference to acquire a corrected height difference and dividing the corrected height difference by the time difference to acquire a corrected rising velocity of the bubble.

Further, the system includes a pulse transmitting and receiving device, which is electrically connected to the two ultrasonic transmitting and receiving transducers and the host computer. The pulse transmitting and receiving device is configured to provide the first pulse signals to be converted into the first ultrasonic signals by the two ultrasonic transmitting and receiving transducers, receive the second pulse signals converted from the second ultrasonic signals received by the two ultrasonic transmitting and receiving transducers, and upload the second pulse signals to the host computer.

The method for measuring a rising velocity and deformation of a bubble in a viscous fluid includes:
  S1: generating a bubble at the bottom of a viscous fluid;
  S2: transmitting first ultrasonic signals at a first height and a second height of the viscous fluid respectively and receiving second ultrasonic signals reflected by the bubble; and S3: analyzing time-domain information of two second ultrasonic signals, calculating a rising velocity of the bubble, building a mathematical model about a bubble size and a reflected sound pressure, analyzing frequency-domain information of the two second ultrasonic signals, and calculating a deformation of the bubble.

Further, the rising velocity of the bubble is calculated by calculating the time difference of the second ultrasonic signals received by the two ultrasonic transmitting and receiving transducers and dividing the height difference of the two ultrasonic transmitting and receiving transducers by the time difference to acquire the rising velocity of the bubble.

Further, the deformation of the bubble is calculated by substituting reflected sound pressures of the second ultrasonic signals received by the two ultrasonic transmitting and receiving transducers into the mathematical model to acquire two bubble sizes and calculating a difference between the two bubble sizes to acquire the deformation of the bubble.

Further, after S3, the method includes S4: correcting the rising velocity of the bubble according to the bubble sizes by subtracting the difference between the two bubble sizes from the height difference to acquire a corrected height difference and dividing the corrected height difference by the time difference to acquire a corrected rising velocity of the bubble.

Compared with the prior art, the present disclosure has the following beneficial effects:

1. The present disclosure uses two ultrasonic transmitting and receiving transducers to realize one-time transmitting and receiving and analyzes the time-domain and frequency-domain of the ultrasonic signals to realize the simultaneous online measurement of the rising velocity and deformation of the bubble in the viscous fluid.

2. The present disclosure corrects the rising velocity of the bubble based on the measured size of the bubble, such that the calculation result is more accurate.

Figure 1:
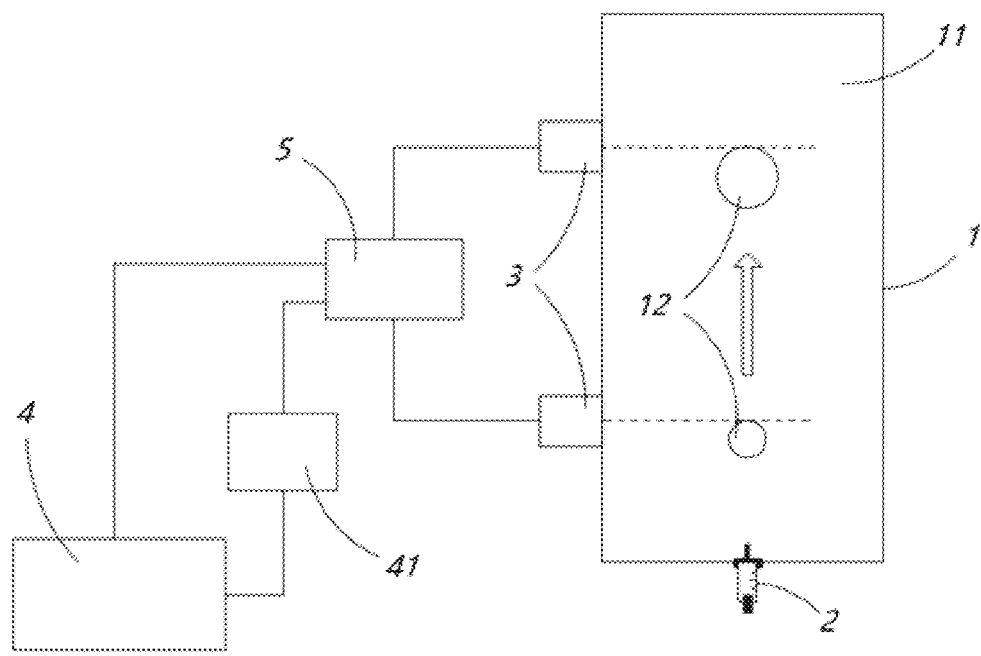
FIG. 1 shows a structure of a system according to the present disclosure.

REFERENCE NUMERALS 1. sample cell;
11. viscous fluid;
12. bubble;
2. variable-diameter syringe;
3. ultrasonic transmitting and receiving transducer;
4. host computer;
41. data acquisition card; and
5. pulse transmitting and receiving device.

DETAILED DESCRIPTION OF THE EMBODIMENTS

The technical solutions in the embodiments of the present disclosure are described clearly and completely below. The described embodiments are merely part, rather than all, of the embodiments of the present disclosure. All other embodiments obtained by those of ordinary skill in the art based on the embodiments of the present disclosure without creative efforts should fall within the protection scope of the present disclosure.

Embodiment 1

Referring to FIG. 1, this embodiment provides a system for measuring a rising velocity and deformation of a bubble in a viscous fluid, including:

sample cell 1 configured to hold a viscous fluid 11;

variable-diameter syringe 2 provided at the bottom of the sample cell 1 and configured to generate a bubble 12 moving from bottom to top in the viscous fluid 11, where an initial size of the bubble 12 is adjustable by a diameter of the variable-diameter syringe 2;

two ultrasonic transmitting and receiving transducers 3 arranged at different heights of the sample cell 1 and configured to transmit first ultrasonic signals to the viscous fluid 11 and receive second ultrasonic signals reflected by the bubble 12; and host computer 4 configured to analyze time-domain information of the second ultrasonic signals received by the two ultrasonic transmitting and receiving transducers 3, calculate a rising velocity of the bubble, build a mathematical model about a bubble size and a reflected sound pressure, analyze frequency-domain information of the second ultrasonic signals received by the two ultrasonic transmitting and receiving transducers 3, and calculate the deformation of the bubble.

It is worth mentioning that the host computer 4 cannot directly analyze the ultrasonic signals, so the ultrasonic transmitting and receiving transducers 3 convert the ultrasonic signals into electrical signals.

Further, in this embodiment, the system includes pulse transmitting and receiving device 5, preferably a double-channel pulse transmitting and receiving device, which is electrically connected to the two ultrasonic transmitting and receiving transducers 3 and the host computer 4. The pulse transmitting and receiving device is configured to provide the first pulse signals to be converted into the first ultrasonic signals by the two ultrasonic transmitting and receiving transducers, receive the second pulse signals converted from the second ultrasonic signals received by the two ultrasonic transmitting and receiving transducers, and upload the second pulse signals to the host computer.

Specifically, the two ultrasonic transmitting and receiving transducers 3 respectively transmit pulse signals under the excitation of the two channels of the pulse transmitting and receiving device 5. The amplitude, repetition frequency, and other parameters of the pulse signals are controlled by corresponding software on the host computer. In the present disclosure, the two pulse signals are identical. Taking one of the ultrasonic transmitting and receiving transducers 3 as an example, the first ultrasonic signal enters the viscous fluid and encounters the bubble. Due to the difference in impedance between the gas and the viscous fluid, the first ultrasonic signal is reflected at a bubble interface to form the second ultrasonic signal. The second ultrasonic signal is returned to the ultrasonic transmitting and receiving transducer 3 and synchronized to the host computer by a data acquisition card 41.

Figure 2:
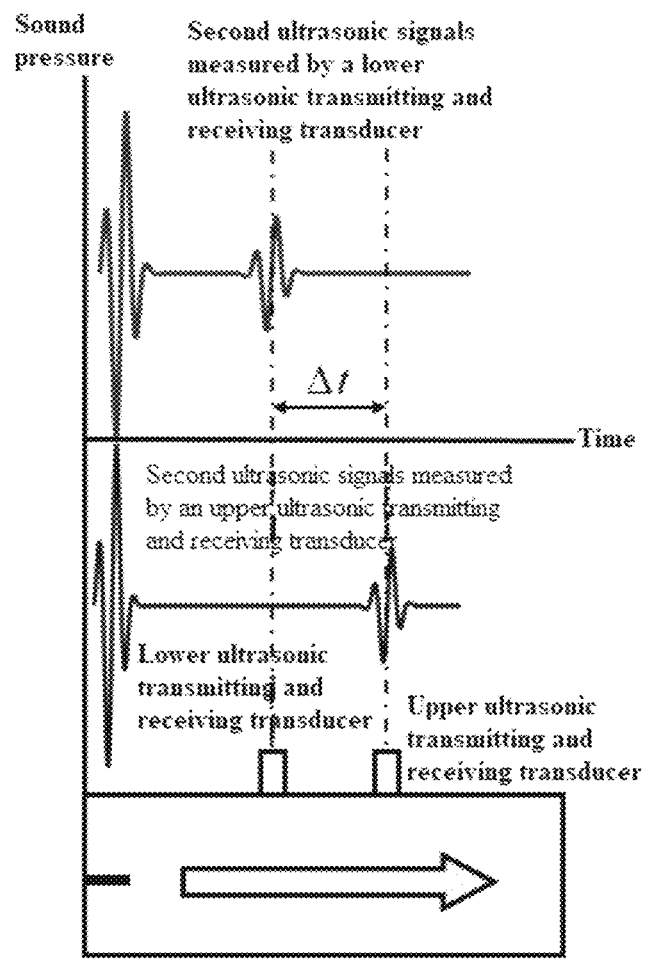
FIG. 2 shows a comparison of time-domain information of second ultrasonic signals received by two ultrasonic transmitting and receiving transducers according to the present disclosure.

At the bottom of the sample cell 1, the variable-diameter syringe 2 injects the gas to generate the bubble moving from bottom to top. The bubble first reflects the first ultrasonic signal sent by the ultrasonic transmitting and receiving transducer 3 at the lower side of the sample cell 1 to form one second ultrasonic signal. After a period of time, when the bubble moves to a position corresponding to the center of the ultrasonic transmitting and receiving transducer 3 at an upper side of the sample cell, the first ultrasonic signal sent by the ultrasonic transmitting and receiving transducer 3 at the upper side of the sample cell 1 is reflected to form the other second ultrasonic signal. As shown in FIG. 2, the rising velocity of the bubble is calculated by calculating a time difference $\Delta t$ of the second ultrasonic signals received by the two ultrasonic transmitting and receiving transducers and dividing a height difference $\Delta L$ of the two ultrasonic transmitting and receiving transducers by the time difference $\Delta t$ to acquire the rising velocity of the bubble, that is, $v = \Delta L / \Delta t$.

Figure 3:
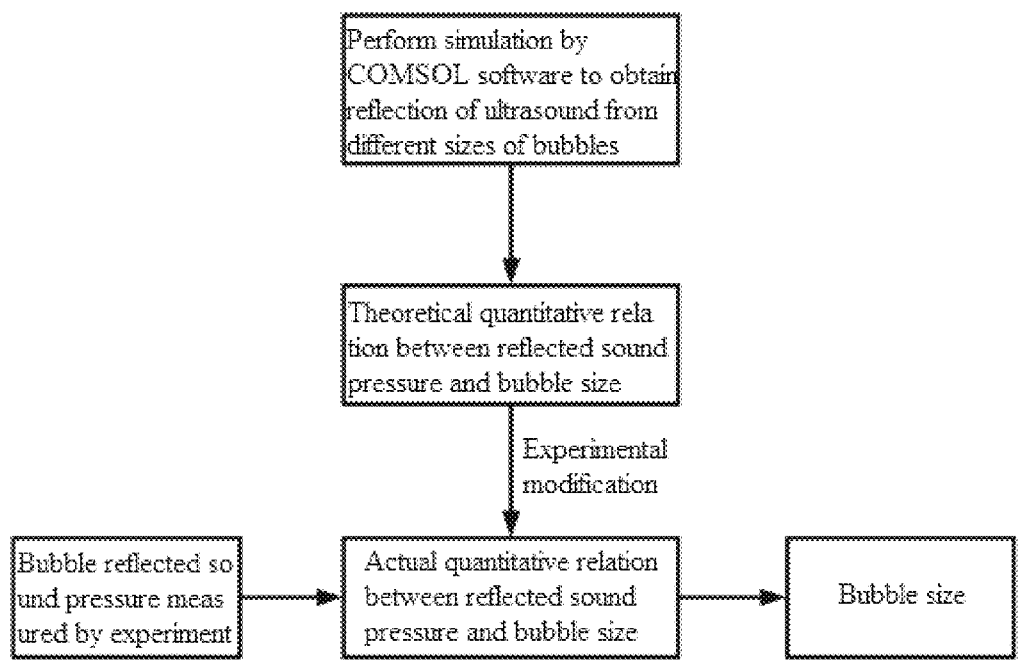
FIG. 3 shows a measurement process of a deformation of a bubble according to the present disclosure.
Figure 4:
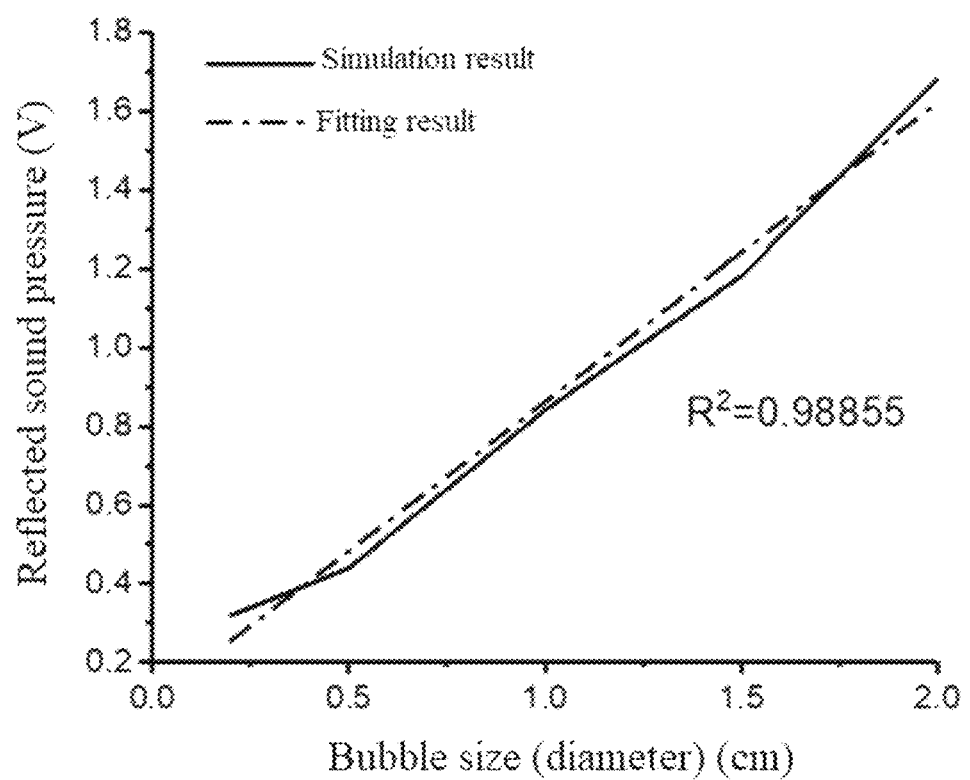
FIG. 4 shows the relationship between the reflected sound pressure and bubble size according to the present disclosure.

As shown in FIG. 3, in this embodiment, the deformation of the bubble is calculated as follows:

The ultrasonic reflection of different sizes (0.2 cm, 0.5 cm, 1 cm, 1.5 cm, and 2 cm) of bubbles in a viscous fluid or gasoline was simulated by COMSOL software. The bubble was 10 cm away from an ultrasonic probe. As shown in FIG. 4, after simulation, the theoretical mathematical model about the reflected sound pressure and the bubble was derived from $y=0.75779x+0.1039$. The 0.6 cm bubble was selected for the experiment, and the reflected sound pressure was 0.0727 V. The theoretical mathematical model $y=0.75779x+0.1039$ was corrected based on the experimental data.

$$k=0.0727/(0.75779*0.6+0.1039)=0.1302$$

The actual mathematical model between the reflected sound pressure and the bubble was $y=0.1302 \times (0.75779x+0.1039)=0.0987x+0.0135$, where y denotes the reflected sound pressure and x denotes the diameter of the bubble.

The reflected sound pressures of the second ultrasonic signals received by the two ultrasonic transmitting and receiving transducers are substituted into the mathematical model to acquire two bubble sizes, and the difference between the two bubble sizes is calculated to acquire the deformation of the bubble.

Figure 5:
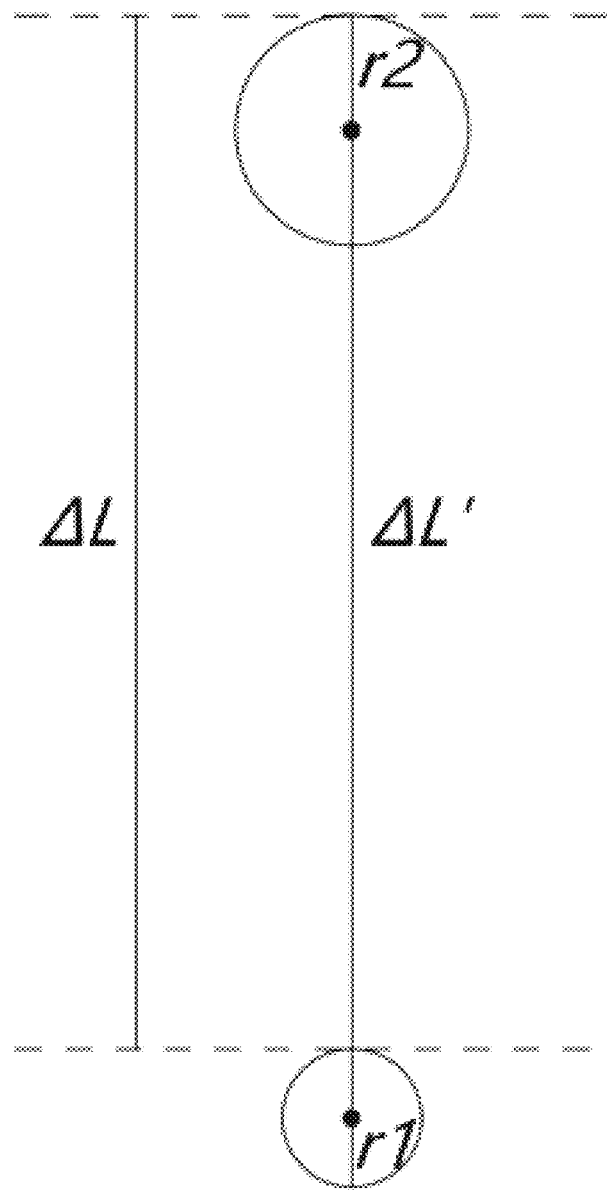
FIG. 5 shows a correction of the rising velocity of the bubble according to the present disclosure.

As shown in FIG. 5, when the rising velocity of the bubble is calculated by $v=\Delta L/\Delta t$, the height difference $\Delta L$ is the distance between the two bubble vertices, and the actual moving distance of the bubble is the distance between the two bubble center points. Therefore, the host computer further corrects the rising velocity of the bubble according to the bubble sizes by:

subtracting the difference between the two bubble sizes $|r_2-r_1|$ from the height difference to acquire a corrected height difference $\Delta L'=\Delta L-|r_2-r_1|$ and dividing the corrected height difference $\Delta L'$ by the time difference $\Delta t$ to acquire a corrected rising velocity $v'$ of the bubble.

Embodiment 2

The method for measuring a rising velocity and deformation of a bubble in a viscous fluid includes:

S1. A bubble is generated at the bottom of a viscous fluid.

S2. First ultrasonic signals are transmitted at a first height and a second height of the viscous fluid respectively, and second ultrasonic signals reflected by the bubble are received.

S3. Time-domain information of two second ultrasonic signals is analyzed, a rising velocity of the bubble is calculated, a mathematical model about a bubble size and a reflected sound pressure is built, frequency-domain information of the two second ultrasonic signals are analyzed, and a deformation of the bubble is calculated.

The rising velocity of the bubble is calculated by calculating the time difference of the second ultrasonic signals received by the two ultrasonic transmitting and receiving transducers and dividing the height difference of the two ultrasonic transmitting and receiving transducers by the time difference to acquire the rising velocity of the bubble.

The deformation of the bubble is calculated by substituting reflected sound pressures of the second ultrasonic signals received by the two ultrasonic transmitting and receiving transducers into the mathematical model to acquire two bubble sizes and calculating a difference between the two bubble sizes to acquire the deformation of the bubble.

S4. The rising velocity of the bubble is corrected according to the bubble sizes by subtracting the difference between the two bubble sizes from the height difference to acquire a corrected height difference and dividing the corrected height difference by the time difference to acquire a corrected rising velocity of the bubble.

For those skilled in the art, it is obvious that the present disclosure is not limited to the details of the above embodiments, and the present disclosure can be implemented in other specific forms without departing from the spirit or basic features of the present disclosure. The embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure.

What is claimed is:

1. A system for measuring a rising velocity and a deformation of a bubble in a viscous fluid, comprising:
   a sample cell configured to hold the viscous fluid;
   a variable-diameter syringe provided at a bottom of the sample cell and configured to generate the bubble in the viscous fluid;
   two ultrasonic transmitting and receiving transducers arranged at different heights of the sample cell and configured to transmit respective first ultrasonic signals to the viscous fluid and receive respective second ultrasonic signals reflected by the bubble, wherein the respective second ultrasonic signal received by a first ultrasonic transmitting and receiving transducer of the two ultrasonic transmitting and receiving transducers is formed by the bubble reflecting the respective first ultrasonic signal transmitted by the first ultrasonic transmitting and receiving transducer, and wherein the respective second ultrasonic signal received by a second ultrasonic transmitting and receiving transducer of the two ultrasonic transmitting and receiving transducers is formed by the bubble reflecting the respective first ultrasonic signal transmitted by the second ultrasonic transmitting and receiving transducer; and a host computer configured to analyze time-domain information of the second ultrasonic signals received by the two ultrasonic transmitting and receiving transducers, calculate the rising velocity of the bubble, build a mathematical model about a bubble size and a reflected sound pressure, analyze frequency-domain information of the second ultrasonic signals received by the two ultrasonic transmitting and receiving transducers, and calculate the deformation of the bubble.

2. The system for measuring the rising velocity and the deformation of the bubble in the viscous fluid according to claim 1, wherein the rising velocity of the bubble is calculated by calculating a time difference of the second ultrasonic signals received by the two ultrasonic transmitting and receiving transducers and dividing a height difference of the two ultrasonic transmitting and receiving transducers by the time difference to acquire the rising velocity of the bubble.

3. The system for measuring the rising velocity and the deformation of the bubble in the viscous fluid according to claim 2, wherein the deformation of the bubble is calculated by substituting reflected sound pressures of the second ultrasonic signals received by the two ultrasonic transmitting and receiving transducers into the mathematical model to acquire two bubble sizes and calculating a difference between the two bubble sizes to acquire the deformation of the bubble.

4. The system for measuring the rising velocity and the deformation of the bubble in the viscous fluid according to claim 3, wherein the mathematical model is:

$y=0.0987x+0.0135$, wherein y denotes the reflected sound pressure and x denotes a diameter of the bubble.

5. The system for measuring the rising velocity and the deformation of the bubble in the viscous fluid according to claim 3, wherein the host computer further corrects the rising velocity of the bubble according to the bubble sizes by:

subtracting the difference between the two bubble sizes from the height difference to acquire a corrected height difference and dividing the corrected height difference by the time difference to acquire a corrected rising velocity of the bubble.

6. The system for measuring the rising velocity and the deformation of the bubble in the viscous fluid according to claim 1, wherein the mathematical model is:

$y=0.0987x+0.0135$, wherein y denotes the reflected sound pressure and x denotes a diameter of the bubble.

7. The system for measuring the rising velocity and the deformation of the bubble in the viscous fluid according to claim 1, further comprising a pulse transmitting and receiving device, wherein the pulse transmitting and receiving device is electrically connected to the two ultrasonic transmitting and receiving transducers and the host computer and configured to provide first pulse signals to be converted into the first ultrasonic signals by the two ultrasonic transmitting and receiving transducers, receive second pulse signals converted from the second ultrasonic signals received by the two ultrasonic transmitting and receiving transducers, and upload the second pulse signals to the host computer.

8. A method for measuring a rising velocity and a deformation of a bubble in a viscous fluid, comprising:

S1: generating the bubble at a bottom of the viscous fluid;

S2: transmitting, respective first ultrasonic signals at a first height and a second height of the viscous fluid, receiving at the first height a respective second ultrasonic signal formed by the bubble reflecting the respective first ultrasonic signal transmitted at the first height, and receiving at the second height a respective second ultrasonic signal formed by the bubble reflecting the respective first ultrasonic signal transmitted at the second height; and S3: analyzing time-domain information of the second ultrasonic signals, calculating the rising velocity of the bubble, building a mathematical model about a bubble size and a reflected sound pressure, analyzing frequency-domain information of the second ultrasonic signals, and calculating the deformation of the bubble.

9. The method for measuring the rising velocity and the deformation of the bubble in the viscous fluid according to claim 8, wherein the rising velocity of the bubble is calculated by calculating a time difference of the second ultrasonic signals received by the two ultrasonic transmitting and receiving transducers and dividing a height difference of the two ultrasonic transmitting and receiving transducers by the time difference to acquire the rising velocity of the bubble.

10. The method for measuring the rising velocity and the deformation of the bubble in the viscous fluid according to claim 9, wherein the deformation of the bubble is calculated by substituting reflected sound pressures of the second ultrasonic signals received by the two ultrasonic transmitting and receiving transducers into the mathematical model to acquire two bubble sizes and calculating a difference between the two bubble sizes to acquire the deformation of the bubble.

11. The method for measuring the rising velocity and the deformation of the bubble in the viscous fluid according to claim 10, wherein after S3, the method further comprises S4: correcting the rising velocity of the bubble according to the bubble sizes by subtracting the difference between the two bubble sizes from the height difference to acquire a corrected height difference and dividing the corrected height difference by the time difference to acquire a corrected rising velocity of the bubble.

\* \* \* \* \*